US012479701B2

(12) United States Patent
Chen et al.

(10) Patent No.: US 12,479,701 B2
(45) Date of Patent: Nov. 25, 2025

(54) ELEVATOR CAR DOOR LOCKING DEVICE AND ELEVATOR EQUIPMENT

(71) Applicant: Otis Elevator Company, Farmington, CT (US)

(72) Inventors: Chong Chen, Hangzhou (CN); Haiping Pan, Hangzhou (CN); Xiu Jian, Hangzhou (CN); Haiyun Qian, Hangzhou (CN); Qiguo Li, Hangzhou (CN); Zhijia Zheng, Hangzhou (CN); Yi Shi, Hangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 100 days.

(21) Appl. No.: 18/360,104

(22) Filed: Jul. 27, 2023

(65) Prior Publication Data

US 2024/0158206 A1 May 16, 2024

(30) Foreign Application Priority Data

Nov. 10, 2022 (CN) ......................... 202211406791.9

(51) Int. Cl.
*B66B 13/20* (2006.01)

(52) U.S. Cl.
CPC .................................... *B66B 13/20* (2013.01)

(58) Field of Classification Search
CPC ................................ B66B 13/20; B66B 13/12
See application file for complete search history.

(56) References Cited

U.S. PATENT DOCUMENTS

| | | | |
|---|---|---|---|
| 7,100,745 B2 | 9/2006 | Bisang et al. |
| 7,252,179 B2 | 8/2007 | Oberleitner |
| 9,637,350 B2 | 5/2017 | Mittermayr |
| 10,427,914 B2 | 10/2019 | Zhang et al. |
| 2021/0276829 A1 | 9/2021 | Kashiwakura |

FOREIGN PATENT DOCUMENTS

| | | |
|---|---|---|
| CN | 100383030 C | 4/2008 |
| CN | 201560030 U | 8/2010 |
| CN | 102923554 A | 2/2013 |
| CN | 203845642 U | 9/2014 |

(Continued)

OTHER PUBLICATIONS

Machine Translation of CN 107010519.*

*Primary Examiner* — Diem M Tran
(74) *Attorney, Agent, or Firm* — CANTOR COLBURN LLP

(57) ABSTRACT

An elevator car door locking device and elevator equipment. The car door locking device includes a vane base provided with a first and a second rotation center; a vane assembly provided with a clamping vane or an expanding vane; and a vane drive assembly having a driving member, a transmission member, an unlocking member and a car door locking hook. The driving member, the transmission member and the vane assembly are hinged to the first rotation center, the car door locking hook is hinged to the second rotation center, the transmission member is hinged with the vane assembly through a connecting shaft, and the unlocking member is hinged to a third rotation center on the driving member and is provided with a limiting part for limiting the connecting shaft.

14 Claims, 11 Drawing Sheets

(56) References Cited

FOREIGN PATENT DOCUMENTS

| | | | |
|---|---|---|---|
| CN | 204224051 | U | 3/2015 |
| CN | 103287953 | B | 5/2015 |
| CN | 103723605 | B | 8/2015 |
| CN | 103935873 | B | 8/2015 |
| CN | 102774733 | B | 9/2015 |
| CN | 104192684 | B | 11/2015 |
| CN | 103738818 | B | 12/2015 |
| CN | 103231974 | B | 2/2016 |
| CN | 103950814 | B | 3/2016 |
| CN | 105366513 | A | 3/2016 |
| CN | 104773637 | B | 6/2016 |
| CN | 104773638 | B | 6/2016 |
| CN | 105645239 | A | 6/2016 |
| CN | 104098011 | B | 8/2016 |
| CN | 104760872 | B | 1/2017 |
| CN | 104760873 | B | 1/2017 |
| CN | 105035922 | B | 1/2017 |
| CN | 105035921 | B | 3/2017 |
| CN | 206051242 | U | 3/2017 |
| CN | 206336895 | U | 7/2017 |
| CN | 107010519 | A | 8/2017 |
| CN | 105731229 | B | 9/2017 |
| CN | 105947852 | B | 10/2017 |
| CN | 106276529 | B | 3/2018 |
| CN | 108502687 | A | 9/2018 |
| CN | 108657919 | A | 10/2018 |
| CN | 208648508 | U | 3/2019 |
| CN | 208856760 | U | 5/2019 |
| CN | 209468009 | U | 10/2019 |
| CN | 110526092 | A | 12/2019 |
| CN | 110626927 | A | 12/2019 |
| CN | 108439158 | B | 6/2020 |
| CN | 111439659 | A | 7/2020 |
| CN | 111470397 | A | 7/2020 |
| CN | 111646348 | A | 9/2020 |
| CN | 111717766 | A | 9/2020 |
| CN | 111943009 | A | 11/2020 |
| CN | 112551328 | A | 3/2021 |
| CN | 213679395 | U | 7/2021 |
| CN | 113291957 | A | 8/2021 |
| CN | 113291958 | A | 8/2021 |
| CN | 113415702 | A | 9/2021 |
| CN | 113415703 | A | 9/2021 |
| CN | 113415704 | A | 9/2021 |
| CN | 214733684 | U | 11/2021 |
| CN | 106869624 | B | 1/2022 |
| CN | 215666512 | U | 1/2022 |
| CN | 216583699 | U | 5/2022 |
| CN | 111717767 | B | 6/2022 |
| CN | 217417843 | U | 9/2022 |
| EP | 1366258 | B1 | 12/2005 |
| EP | 1727762 | B1 | 3/2008 |
| EP | 1886963 | B1 | 9/2013 |
| EP | 3659957 | A1 | 6/2020 |
| EP | 2944598 | B1 | 7/2022 |
| KR | 100877182 | B1 | 1/2009 |

* cited by examiner

ELEVATOR CAR DOOR LOCKING DEVICE AND ELEVATOR EQUIPMENT

FOREIGN PRIORITY

This application claims priority to Chinese Patent Application No. 202211406791.9, filed Nov. 10, 2022, and all the benefits accruing therefrom under 35 U.S.C. § 119, the contents of which in its entirety are herein incorporated by reference.

TECHNICAL FIELD

The present disclosure relates to the technical field of electromechanical equipment, in particular to an elevator car door locking device and elevator equipment.

BACKGROUND

In many places such as commercial office buildings, manufacturing facilities, and residential buildings, especially in many high-rise buildings, people have widely installed and used various kinds of elevator equipment to transport people, goods, or pets, and thus obtained great convenience.

However, elevator equipment may need to be replaced or repaired in whole or in part due to various reasons during use. In some cases, based on the considerations of, for example, reducing the work amount of equipment disassembly and assembly, reducing the construction time, saving costs, etc., it may be necessary to retain and reuse some of the original devices in the elevator equipment, such as elevator landing doors, elevator car doors, counterweights, and the like, so that fewer new devices need to be installed. These new devices are usually directly selected from the existing products that are compatible with the retained original devices.

SUMMARY

In view of the foregoing, the present disclosure provides an elevator car door locking device and elevator equipment, so as to solve or at least alleviate one or more of the aforementioned problems and other problems in the prior art, or to provide an alternative technical solution for the prior art.

According to a first aspect of the present disclosure, an elevator car door locking device is first provided, which comprises: a vane base provided with a first rotation center and a second rotation center; a vane assembly mounted on the vane base and provided with a clamping van or an expanding vane, and a vane drive assembly mounted on the vane base and having a driving member, a transmission member, an unlocking member and a car door locking hook, wherein the driving member, the transmission member and the vane assembly are hinged to the first rotation center, the car door locking hook is hinged to the second rotation center and has a locked state and an unlocked state, the transmission member is further hinged with the vane assembly through a connecting shaft, and the unlocking member is hinged to a third rotation center on the driving member and is provided with a limiting part for limiting the connecting shaft, wherein the driving member, when driven to move, drives the driving member, the connecting shaft and the unlocking member to rotate around the first rotation center toward a first direction or an opposite second direction, wherein, when the vane assembly is not in contact with a landing door locking ball, the connecting shaft is located at a first limit position on the unlocking member and drives the vane assembly to open or close, and the unlocking member swings along an arc-shaped part on the car door locking hook; when the vane assembly is in contact with the landing door locking ball and is restricted in movement, the connecting shaft rotates to a second limit position on the unlocking member, and the unlocking member swings around the third rotation center to offset the arc-shaped part by a displacement, so that the car door locking hook rotates around the second rotation center toward the first direction until reaching the unlocked state, or rotates toward the second direction until reaching the locked state.

In the elevator car door locking device according to the present disclosure, optionally, the vane assembly comprises a first vane, a second vane, a first linkage and a second linkage, the first vane and the second vane are hinged with the first linkage and the second linkage respectively to form a four-linkage mechanism, the first linkage is hinged to the first rotation center and is hinged with the transmission member through the connecting shaft, the second linkage is hinged to a fourth rotation center on the vane base, and the fourth rotation center is located directly below the first rotation center along a longitudinal direction of the vane base.

In the elevator car door locking device according to the present disclosure, optionally, the linkages of the clamping vane or the expanding vane are symmetrically arranged with respect to a connecting line passing through the first rotation center and the fourth rotation center.

In the elevator car door locking device according to the present disclosure, optionally, the vane assembly is configured such that:

$$L\_DC = Z2/\mathrm{SIN}(\angle c + \angle d + \angle e), \text{ and}$$

$$L\_OD/L\_OC = Y2/(Y1+Y2)$$

wherein L_DC is a distance between a first hinge point and a second hinge point in a length direction of the first linkage, the first hinge point is a hinge point between the first vane and the first linkage, and the second hinge point is a hinge point between the second vane and the first linkage; L_OD is a distance between the first rotation center and the first hinge point in the length direction of the first linkage; L_OC is a distance between the first rotation center and the second hinge point in the length direction of the first linkage; Z2 is a distance between the first vane and the second vane after the car door locking hook is unlocked; ∠c, ∠d, ∠e are respectively an included angle between the transmission member and the first linkage, an included angle between the transmission member and a longitudinal line of the vane base, and an unlocking rotation angle of the transmission member when the car door locking hook is turned from a locked state to an unlocked state; Y1 is an unlocking distance of an elevator landing door locking ball; and Y2 is a gap between the elevator landing door locking ball and the first vane.

In the elevator car door locking device according to the present disclosure, optionally, the unlocking rotation angle Le of the transmission member is set according to the following formula:

$$\angle e = k * ar\ \sin(L/L\_PG)$$

wherein L_PG is a length of the car door locking hook, L is an unlocking height of the car door locking hook, and k is a coefficient whose value range is 0.5-2.0.

In the elevator car door locking device according to the present disclosure, optionally, the car door locking hook is kept in the locked state through a first elastic restoring member mounted on the vane base and connected with the car door locking hook, and a second elastic restoring member is mounted on the vane base and connected with the driving member, the first elastic restoring member comprising a torsion spring and the second elastic restoring member comprising a tension spring.

In the elevator car door locking device according to the present disclosure, optionally, the limiting part is a waist-shaped hole, and/or the arc-shaped part is a chute with an arc-shaped contour arranged on the car door locking hook.

In the elevator car door locking device according to the present disclosure, optionally, the arc-shaped contour of the chute is configured to take the first rotation center as the center of a circle when the car door locking hook is in the locked state.

In the elevator car door locking device according to the present disclosure, optionally, the vane base has a first side and a second side opposite to each other, and the vane drive assembly and the vane assembly are respectively arranged on the first side and the second side.

In the elevator car door locking device according to the present disclosure, optionally, the unlocking member and the transmission member are respectively arranged on both sides of the driving member, the unlocking member is closer to the first side than the transmission member, the connecting shaft is connected with the limiting part of the unlocking member in a sliding manner, and the car door locking hook and the driving member are respectively arranged on both sides of the connecting shaft.

In the elevator car door locking device according to the present disclosure, optionally, the vane base is further provided with a limiting mechanism and a guiding mechanism, and the limiting mechanism has a limiting part configured to limit a fitting part on the driving member when the car door locking hook is in the locked state, and a guiding mechanism configured to cooperate with the guiding part when the car door locking hook enters the unlocked state from the locked state, so that the limiting part can release the limit for the fitting part.

In the elevator car door locking device according to the present disclosure, optionally, the vane base is provided with a first arc-shaped chute and a second arc-shaped chute, the limiting mechanism is connected with the first arc-shaped chute in a sliding manner, and one end of the driving member is connected with the second arc-shaped chute in a sliding manner.

In the elevator car door locking device according to the present disclosure, optionally, the first arc-shaped chute and the second arc-shaped chute are arranged with the first rotation center as the center of a circle.

In the elevator car door locking device according to the present disclosure, optionally, the limiting part is configured as a concave part, the fitting part is arranged at an end of the driving member, the guiding part is a roller, and the guiding mechanism is provided with a directing part for directing the roller.

In the elevator car door locking device according to the present disclosure, optionally, the vane base is provided with a manual unlocking mechanism which is connected with the guiding mechanism through a third elastic restoring member to facilitate the car door locking hook to enter the unlocked state from the locked state by manually operating the manual unlocking mechanism.

Secondly, according to a second aspect of the present disclosure, an elevator equipment is further provided, which comprises: an elevator car having a car door and a car door locking auxiliary hook mounted on the car door; and the elevator car door locking device, configured to lock the car door by engaging the car door locking hook with the car door locking auxiliary hook to prohibit the car door from opening, and to unlock the car door by disengaging the car door locking hook from the car door locking auxiliary hook to allow opening of the car door.

The elevator car door locking device of the present disclosure boasts the advantages of reasonable structure, easy manufacture and assembly, mass production and low cost, and in particular, is compatible with both the clamping vane and expanding van. Therefore, it can be widely used in many types of elevator equipment with great convenience, and provides an elevator door machine replacement solution that has significant cost advantages and is easy to implement.

BRIEF DESCRIPTION OF THE DRAWINGS

The technical solutions of the present disclosure will be described in further detail below with reference to the accompanying drawings and embodiments. However, it should be understood that these drawings are designed merely for the purpose of explanation and only intended to conceptually illustrate the structural configurations described herein, and are not required to be drawn to scale.

DETAILED DESCRIPTION

Firstly, it should be noted that the structural composition, characteristics, advantages and the like of the elevator car door locking device and elevator equipment according to the present disclosure will be described below by way of examples. However, neither of the descriptions should be understood as limiting the present disclosure in any way.

In the text, the technical terms "first", "second", "third" and "fourth" are only used for the purpose of distinguishing and are not intended to indicate the order and relative importance thereof. The technical term "connect" means that a specific component is directly and/or indirectly connected to another component. The technical term "member" is intended to cover any possible form in terms of structure, composition, etc., for example, it can be composed of single or multiple parts.

In addition, for any single technical feature described or implied in the embodiments mentioned herein, or any single technical feature shown or implied in individual drawings, the present disclosure still allows for any combination or deletion of these technical features (or equivalents thereof) without any technical obstacle. Therefore, it should be considered that these more embodiments according to the present disclosure are also within the scope recorded in this document. Furthermore, general matters known to those skilled in the art, such as the basic structure and working principle of the clamping vane, the expanding vane, the elevator landing door locking ball, etc., will not be repeated here.

FIGS. 1 to 7 show, by way of examples, the general configurations of two different embodiments of the elevator car door locking device according to the present disclosure. A significant difference from the prior art is that the elevator car door locking device is compatible with both the clamping vane and the expanding vane. That is, by using the structures or assemblies of the elevator car door locking device, the elevator car door locking device can be widely used in various kinds of existing elevators and elevator cars manufactured by different manufacturers.

Specifically, first with reference to FIGS. 1 to 5, a first embodiment of the elevator car door locking device is provided with a vane base 1, a vane drive assembly 2, and a vane assembly 3. In general, the vane base 1 is the basic load-bearing part of the whole device, which can usually be configured into suitable shapes such as a flat plate and can be made of rigid materials such as metals. The vane drive assembly 2 is mounted on the vane base 1 and can drive the vane assembly 3 to operate. The vane assembly 3 is also mounted on the vane base 1 and is configured to have a clamping vane in this embodiment, which is more clearly shown in FIGS. 4 and 5.

Figure 1:
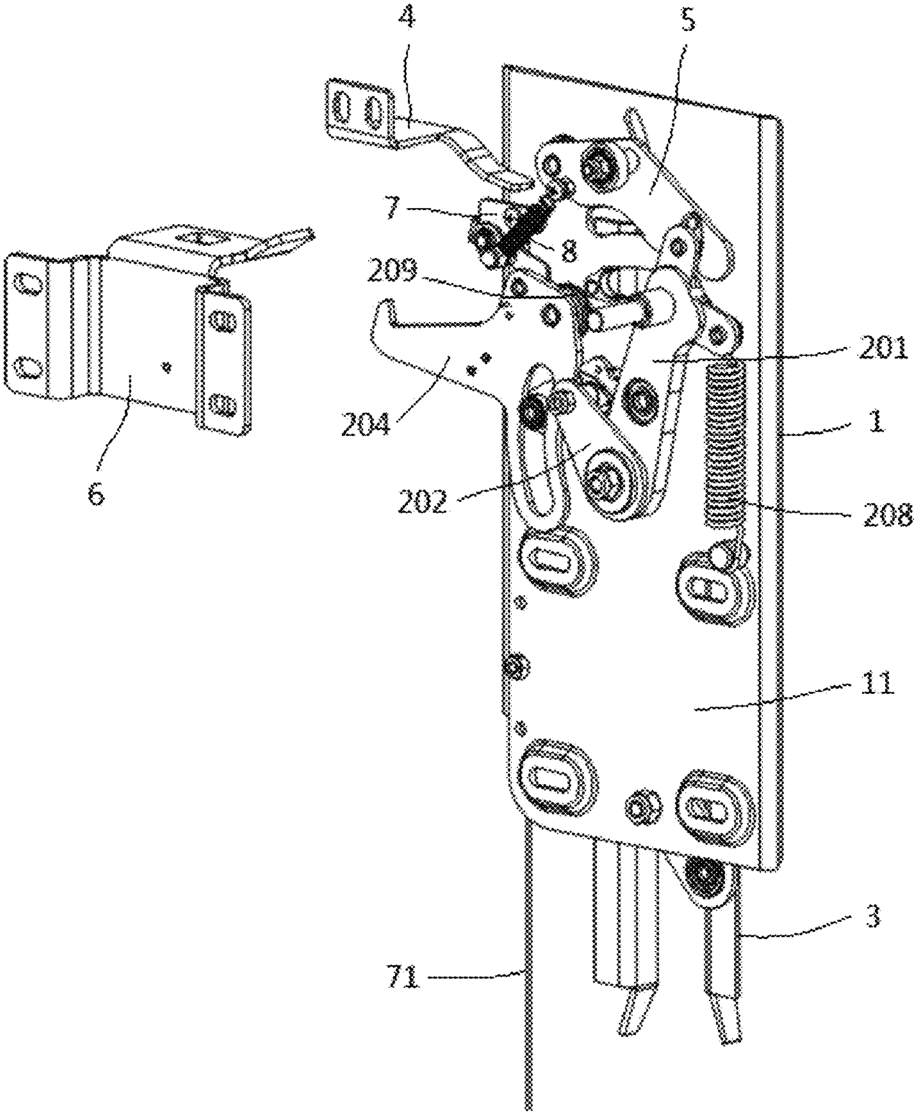
FIG. 1 is a three-dimensional structural diagram of an embodiment of an elevator car door locking device according to the present disclosure, in which a car door locking auxiliary hook is also shown.
Figure 4:
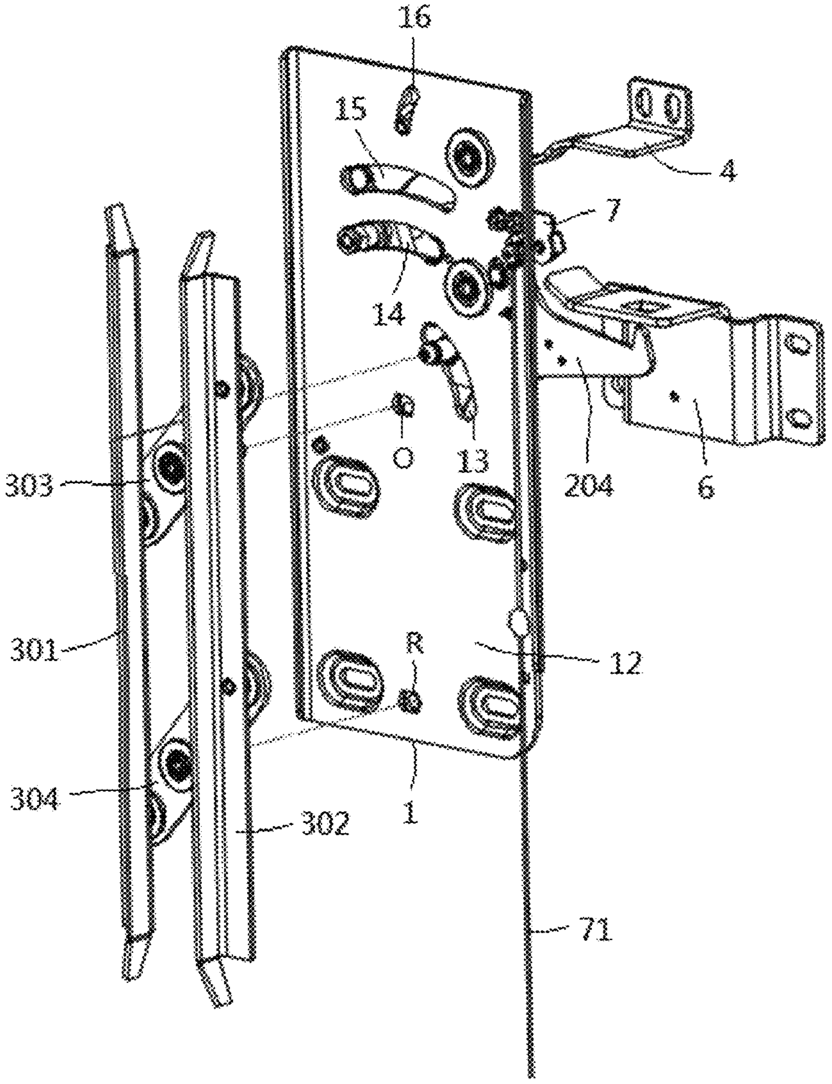
FIG. 4 is a three-dimensional structural diagram of the embodiment of the elevator car door locking device shown in FIG. 1, in which a car door locking auxiliary hook and the clamping vane to be mounted on the vane base are shown.
Figure 5:
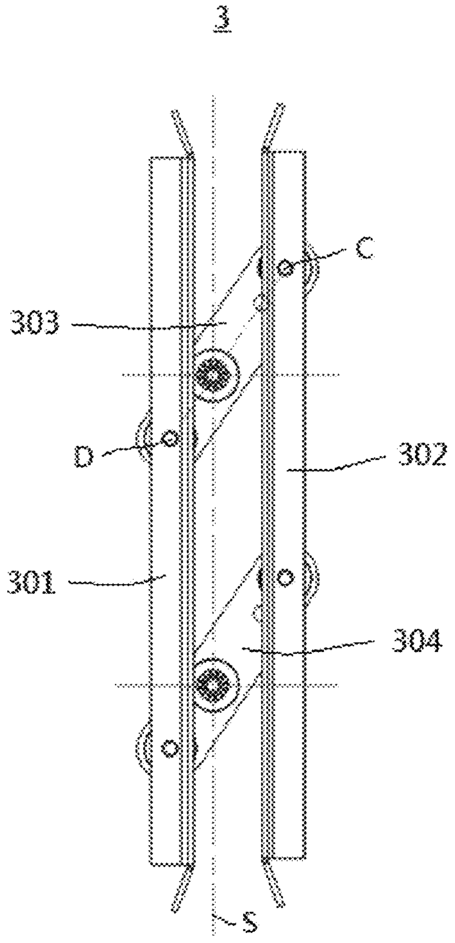
FIG. 5 is a front-view structural diagram of the clamping vane in the embodiment of the elevator car door locking device shown in FIG. 4.

As shown in FIGS. 1 and 4, the vane base 1 can be optionally configured to have a first side 11 and a second side 12 opposite to each other, and the vane drive assembly 2 and the vane assembly 3 are respectively mounted on the first side 11 and the second side 12, which will help these assemblies to work both independently and in cooperation on the two sides, and at the same time form an overall compact layout.

In this embodiment, the vane drive assembly 2 may comprise a driving member 201, a transmission member 202, an unlocking member 203, and a car door locking hook 204. The corresponding functions of the vane drive assembly can be realized through the connection and arrangement between these components.

Figure 2:
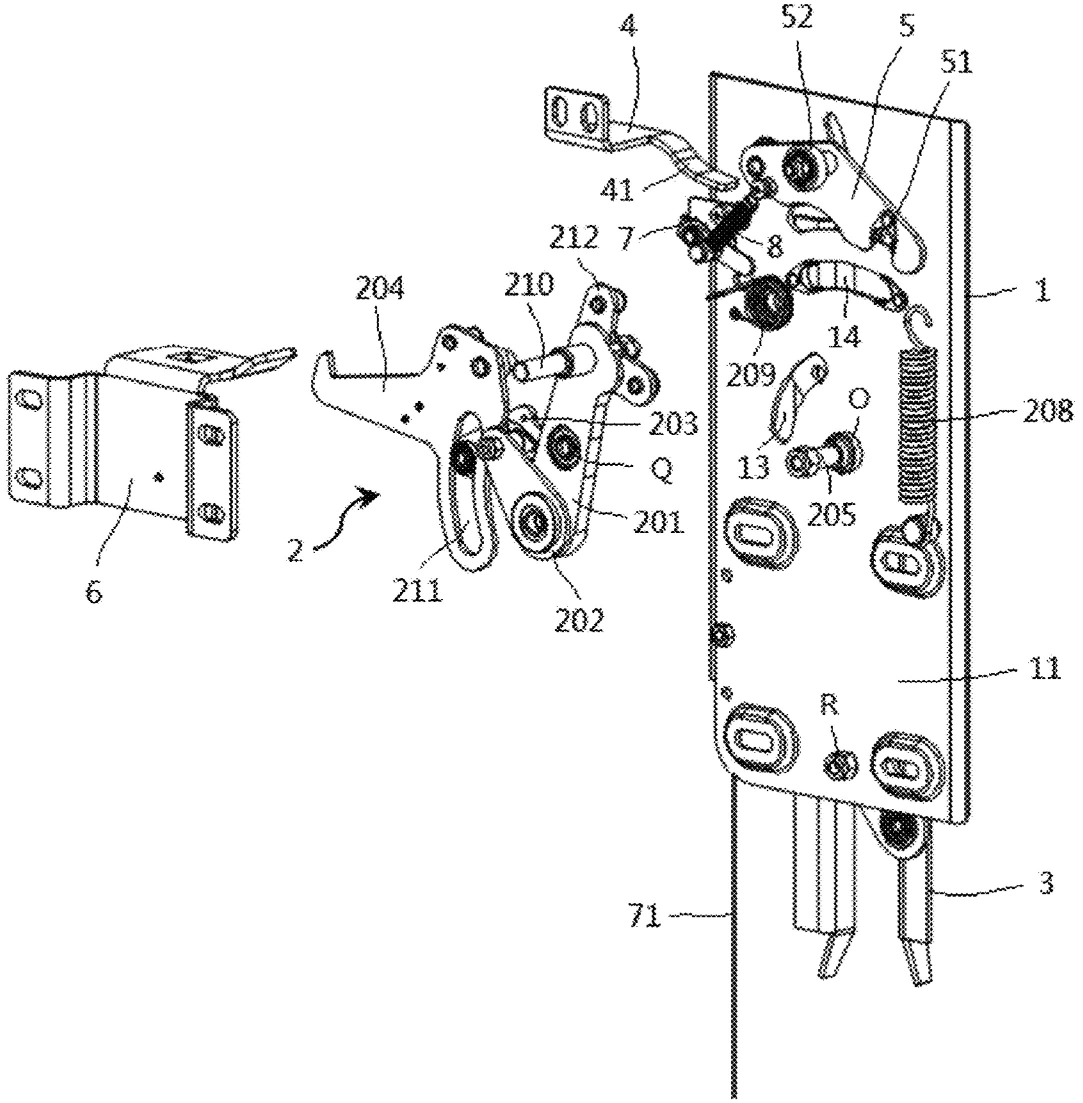
FIG. 2 is a three-dimensional structural diagram in which some components of the embodiment of the elevator car door locking device shown in FIG. 1 are in a disassembled state.
Figure 3:
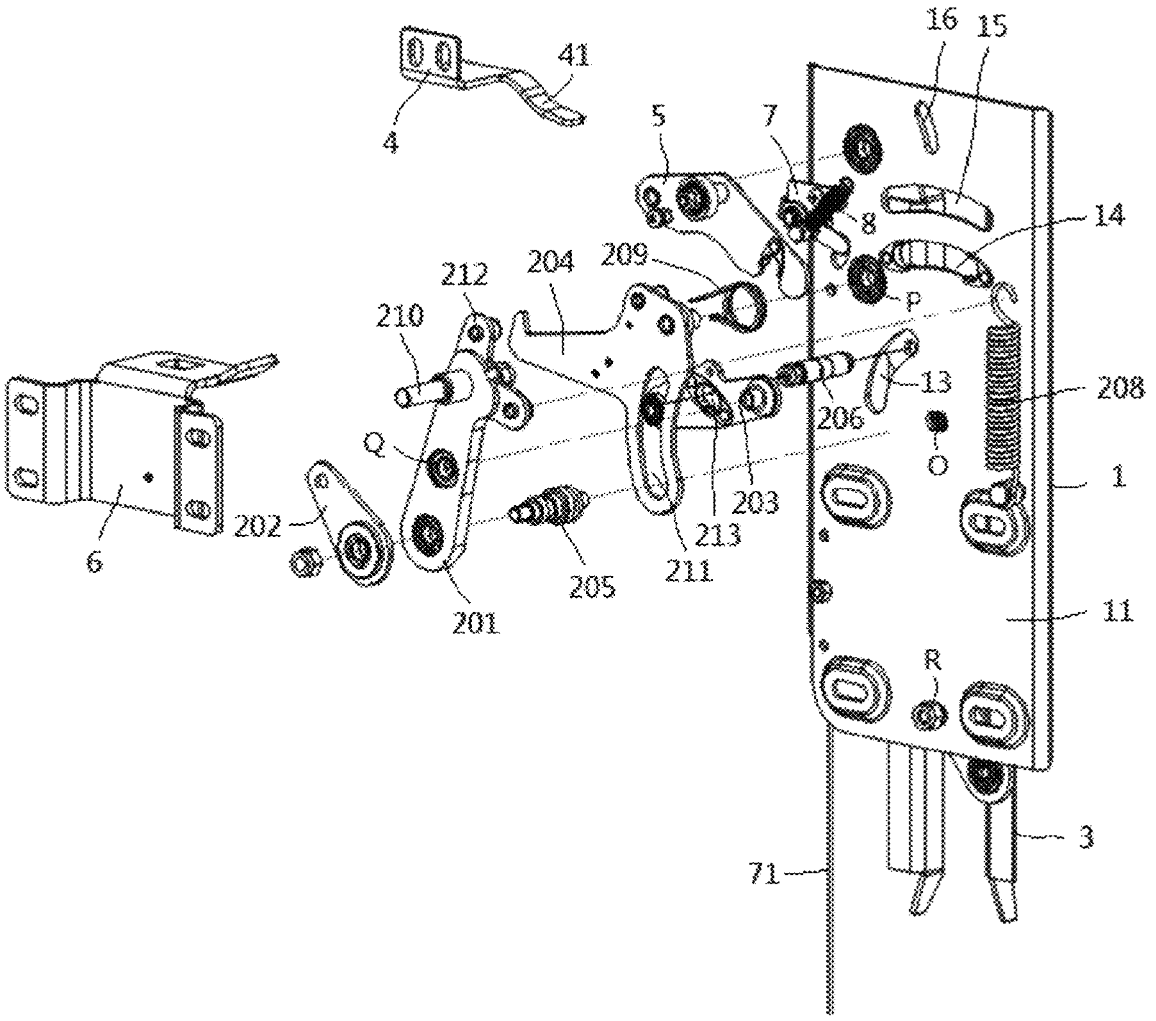
FIG. 3 is another three-dimensional structural diagram in which some components of the embodiment of the elevator car door locking device shown in FIG. 1 are in a disassembled state.

Specifically, as shown in FIGS. 1, 2 and 3, the driving member 201, the transmission member 202 and the vane assembly 3 can be hinged together to a first rotation center O arranged on the vane base 1 through components such as a connecting shaft 205, and the first rotation center O can be optionally arranged at, for example, the middle position or other suitable positions on the vane base 1. In addition, the transmission member 202 and the vane assembly 3 can be hinged together through components such as a connecting shaft 206, and the unlocking member 203 can be hinged to a third rotation center Q arranged on the latter, so that the unlocking member 203 can swing relative to an arc-shaped part 211 on the car door locking hook 204 when in use. And, the car door locking hook 204 can be hinged to a second rotation center P arranged on the vane base 1, wherein the second rotation center P can be optionally arranged at a position relatively deviating from the middle of the vane base 1 or other suitable positions to facilitate the locking or unlocking operation between the car door locking hook 204 and the corresponding matching lock. To facilitate understanding, the above matching lock is exemplarily shown in FIG. 1 and other figures, and is denoted with reference numeral 6. Such matching locks are usually mounted on the car doors of the elevator cars, for example, at suitable positions such as the top of the car door, and are often referred to as the car door locking auxiliary hook.

When there is no external driving force applied on the vane drive assembly 2 and no landing door locking ball 802 is engaged, the driving member 201 is retained in the reset position under the action of the restoring force provided by a second elastic restoring member 208, and the car door locking hook 204, under the action of the restoring force provided by a first elastic restoring member 209, is set at a first limit position limited by a limiting part 213 (e.g., a waist-shaped hole and other structures) on the unlocking member 203 that will contact the connecting shaft 206, so that the car door locking hook is in a locked state at this time.

When there is no external driving force applied on the vane drive assembly 2 and the vane assembly 3 starts to engage with the landing door locking ball 802, the driving member 201 is retained in the reset position under the action of the restoring force provided by the second elastic restoring member 208. The landing door locking ball 802 starts to push the vane assembly 3 and drives a first linkage 303 to rotate, the connecting shaft 206 slides from the first limit position limited by the limiting part 213 on the unlocking member 203 to a second limit position, and the unlocking member 203 starts to swing around the third rotation center Q, which will cause the arc-shaped part 211 on the car door locking hook 204 to offset by a displacement (which can be set according to the specific application), and then the car door locking hook 204 will also rotate around the second rotation center P toward a first direction until unlocking is completed. That is, the car door locking hook 204 will enter an unlocked state by disengaging from the engagement with the matching lock 6, and the door of the elevator car is allowed to be open at this time. When the drive assembly 2 starts to work, the external driving force will be provided to the driving member 201. The driving force can be transmitted, for example, by connecting the door machine in the elevator equipment with a shaft 210 on the driving member 201 through a driving belt. The driving force overcomes the restoring force of the second elastic restoring member 208, and drives the unlocking member 203 hinged with it, the connecting shaft 206 in the first limit position and the transmission member 202 to rotate together around the first rotation center O toward the first direction (e.g., counterclockwise direction can be selected in this embodiment), so as to drive the vane assembly 2 to reach a release size and disengage from the engagement with the landing door locking ball.

It should be noted that in the given embodiments, the car door locking hook 204 is shown as facing upward. However, in one or some other embodiments, the direction of the car door locking hook 204 can be changed to facing downward or other appropriate directions. At this time, locking and unlocking operations of the car door locking hook 204 can also be completed by adjusting the first and second rotation directions of the driving member 201 and other components accordingly.

When it is necessary to keep the car door locking hook 204 in the locked state, one or several elastic restoring members can be arranged. For example, the aforementioned elastic restoring member 209 can be arranged to control the car door locking hook 204 to be retained in the locked state. As shown in FIGS. 1 and 2, the elastic restoring member 209 can be mounted on the vane base 1 and connected with the car door locking hook 204 to achieve the above purpose. In addition, in the above figures, it is also shown that another elastic restoring member 208 is mounted on the vane base 1 and connected with the driving member 201 to provide restoring force to the driving member 201. In specific applications, elastic restoring members can be readily selected from spring components such as torsion spring, tension spring, and the like. For example, the elastic restoring member 209 can use torsion spring, and the elastic restoring member 208 can use tension spring, which has been shown exemplary in the above figures.

In the vane drive assembly 2, the driving member 201 receives the external driving force, and then transmits the driving force through the transmission member 202 and the unlocking member 203 to act on the car door locking hook 204, thereby causing the car door locking hook 204 to move to complete the unlocking or locking operation. For the car door locking hook 204, on the one hand, it is configured to rotate around the second rotation center P on the vane base 1, and on the other hand, it is brought into contact with the unlocking member 203 through the arc-shaped part 211 to receive the driving force transmitted to it by the latter, so as to start the corresponding rotation movement around the second rotation center P.

As to the arc-shaped part 211 on the car door locking hook 204, optionally, it can be configured as a chute with an arc-shaped contour, and the protrusion (such as an axis) arranged on the unlocking member 203 is arranged in the chute, so as to achieve contact and cooperation between the unlocking member 203 and the car door locking hook 204. For another example, the aforementioned chute can be optionally configured that when the car door locking hook 204 is in the locked state, the arc-shaped contour of the chute takes the first rotation center O as the center of the circle, which can facilitate the elevator car door locking device to maintain overall force balance and ensure stable operation when the vane drive assembly is operating.

Optionally, in the vane drive assembly 2, the unlocking member 203 and the transmission member 202 can be respectively arranged on both sides of the driving member 201, and the unlocking member 203 can be arranged closer to the vane base 1 than the transmission member 202, that is, the unlocking member 203 is closer to the first side 11 than the transmission member 202. At the same time, the transmission member 202 is hinged with the first linkage 303 of the vane through the connecting shaft 206 and passes through the middle position of the unlocking member 203. And then, the car door locking hook 204 and the driving member 201 are respectively arranged on both sides of the connecting shaft 206. In this way, a very compact layout is thus formed, and the efficient and reliable transmission of driving force between these components is facilitated.

In addition, some structures can be arranged on the vane base 1 to better define, for example, the movement trajectory of the components arranged on the vane base 1. For example, as shown in FIG. 2 and other figures, arc-shaped chutes 13 and 14 can be arranged on the vane base 1 to respectively connect with the connecting shaft 206 and the driving member 201 in a sliding manner, and arc-shaped chutes 15 and 16 can be arranged to connect with a limiting mechanism 5 in a sliding manner. In practical applications, the arc-shaped chute 13, arc-shaped chute 14 and/or arc-shaped chute 15 can be optionally configured to take the first rotation center O on the vane base 1 as the center of the circle, so as to facilitate the device to achieve overall force balance and stable operation.

A guiding mechanism 4 and a limiting mechanism 5 can be arranged at suitable positions on the vane base 1 to cooperate with the vane drive assembly 2 and other components. For example, the limiting mechanism 5 can be mounted on the upper part of the vane base 1, and configured with a limiting part 51 (such as a concave part) and a guiding part 52 (such as a roller). The limiting part 51 can be used to limit a fitting part 212 (e.g., located at an end) arranged on the driving member 201 when the car door locking hook 204 is in the locked state. For the guiding mechanism 4, it can be configured such that when the car door locking hook 204 enters the unlocked state from the locked state, the guiding mechanism 4 will cooperate with the guiding part 52 on the limiting mechanism 5 to enable the limiting part 51 to release the limit for the fitting part 212. As an example, this can be achieved by, for example, arranging a directing part 41 on the guiding mechanism 4. For example, by means of a directing part 41 with a specific contour matching the contour of a roller, the guiding part 52 in the form of a roller can be guided.

In addition, optionally, a manual unlocking mechanism 7 can also be arranged on the vane base 1 to allow people (such as elevator workers) to safely unlock the car door locking hook 204 by manually operating the manual unlocking mechanism 7 in the event that the car door locking hook cannot be unlocked normally due to equipment failure or emergency situations. As an example, as shown in FIG. 1 and other figures, a third elastic restoring member 8 (such as a tension spring) can be arranged between the manual unlocking mechanism 7 and the guiding mechanism 4, and an unlocking steel wire rope 71 can be configured for the manual unlocking mechanism 7. In this way, by operating the unlocking steel wire rope 71, the unlocking mechanism can be made to push the car door locking hook 204 to rotate around the second rotation center P, so that the car door locking hook 204 enters the unlocked state.

In the first embodiment shown in FIGS. 1 to 5, the vane assembly 3 is provided with a clamping vane, which comprises a first vane 301, a second vane 302, a first linkage 303, and a second linkage 304 constituting a four-linkage mechanism, wherein the first linkage 303 and the second linkage 304 are arranged at a distance from each other, and hinged with the first vane 301 and the second vane 302 respectively. In addition, the first linkage 303 is further hinged to the first rotation center O on the vane base 1 so that it can move in association with the driving member 201 and the transmission member 202. The first vane 301 is closer to the above hinge point than the second vane 302. At the same time, the first linkage 303 is further hinged to the transmission member 202 through the connecting shaft 206 to form an associated movement. The second linkage 304 is further hinged to a fourth rotation center R arranged on the vane base 1. The two linkages 303 and 304 may optionally have the same configuration.

With the aforementioned arrangement, the vane assembly 3 can be reliably mounted on the vane base 1 and form an associated movement with the vane drive assembly 2. Optionally, the fourth rotation center R can be arranged directly below the first rotation center O, that is, the connecting line S between the first rotation center O and the fourth rotation center R forms a vertical line that is parallel to the longitudinal direction of the vane base 1.

Figure 6:
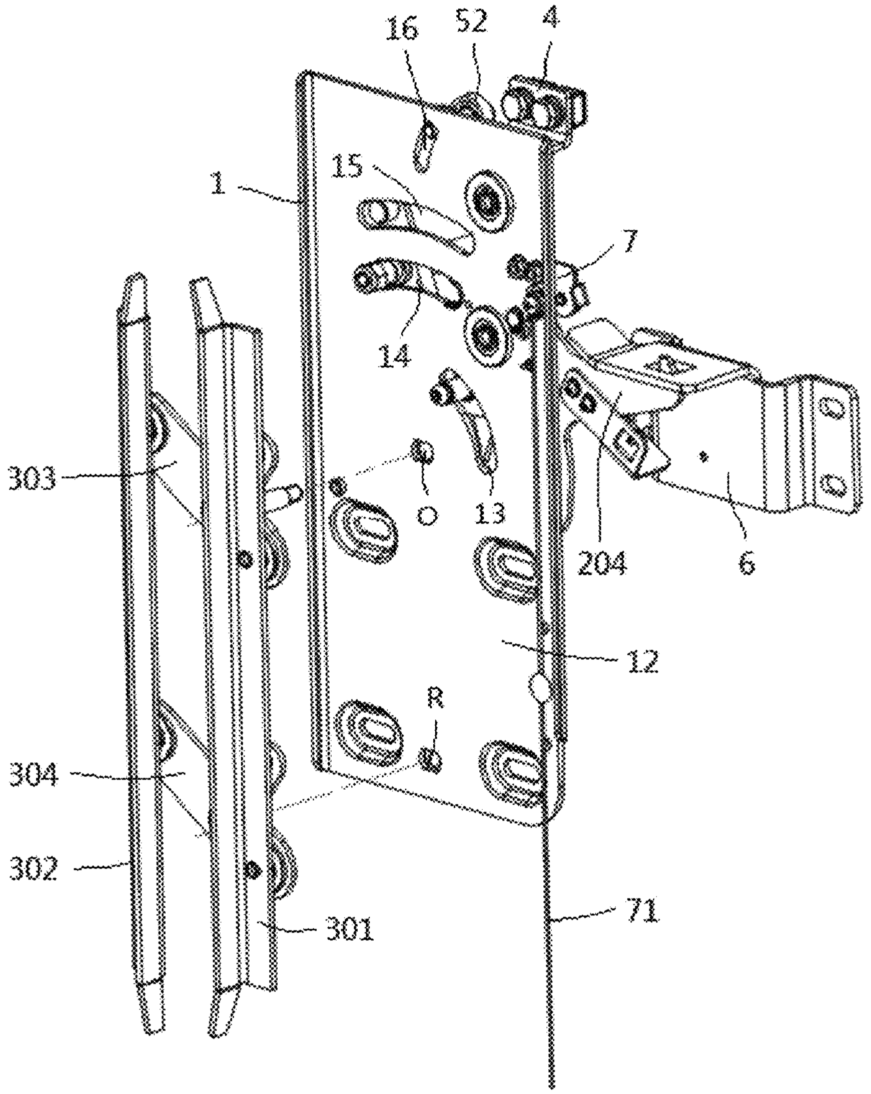
FIG. 6 is a three-dimensional structural diagram of another embodiment of the elevator car door locking device according to the present disclosure, in which a car door locking auxiliary hook and an expanding vane to be mounted on the vane base are shown.
Figure 7:
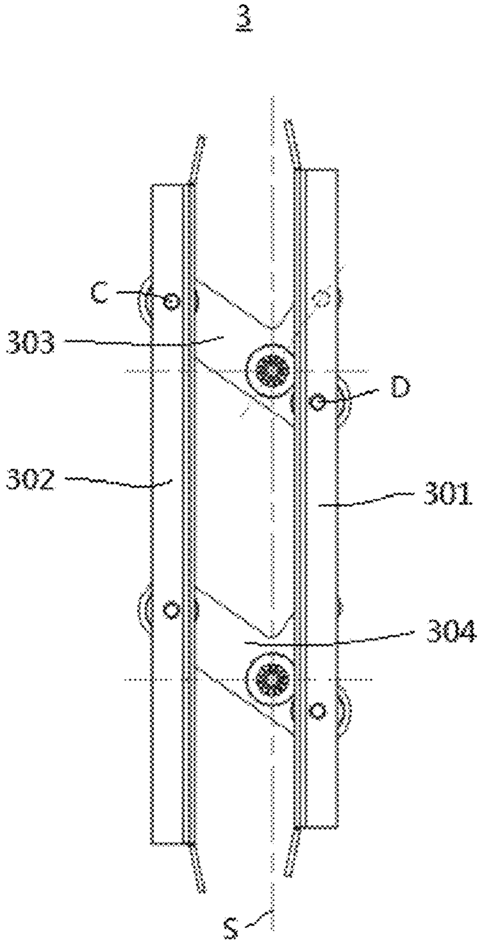
FIG. 7 is a front-view structural diagram of the expanding vane in the embodiment of the elevator car door locking device shown in FIG. 6.

Wirth continued reference to FIGS. 6 and 7, a second embodiment of the elevator car door locking device is shown, which differs from the first embodiment discussed above only in that the vane assembly 3 here is provided with an expanding vane instead of a clamping vane. Except that the expanding vane and the clamping vane differ from each other in terms of type, working mode, application environment, etc., unless otherwise specified herein, the corresponding contents of the vane assembly 3 in the first embodiment, such as composition, arrangement, and the like as described above, are also applicable to the vane assembly 3 provided with an expanding vane in the second embodiment.

As mentioned above, the present disclosure innovatively provides an elevator car door locking device that can be compatible with different types of vanes at the same time. Whether it is a clamping vane or an expanding vane, they can both operate very well under the collaborative operation of the vane drive assembly and the vane base in the elevator car door locking device, which makes it superior as compared to the prior art. It should be noted that a large number of clamping vane products and expanding vane products that are technically mature have been provided in the industry. Those skilled in the art are quite familiar with the respective working characteristics, application environments, and the like of these two types of vanes, and have formed a fixed mindset when considering the specific elevator application scenario. Consequently, only one or the other of the aforesaid two types of vane products will be selected to be used for a specific elevator environment, and at present, many manufacturers have also provided car door lock products of various models specially configured with clamping vanes or expanding vanes for selection by the customers.

In contrast, the present disclosure breaks through the above-mentioned inertial thinking and usage prejudice existing in the industry, and proposes an elevator car door locking device that are compatible with both the clamping vane and the expanding vane. This not only greatly expands the application scope of the elevator car door locking device, but also provides the conditions for mass production, which can significantly reduce the production cost, and is also convenient for centralized procurement, maintenance and use.

Figure 8C:
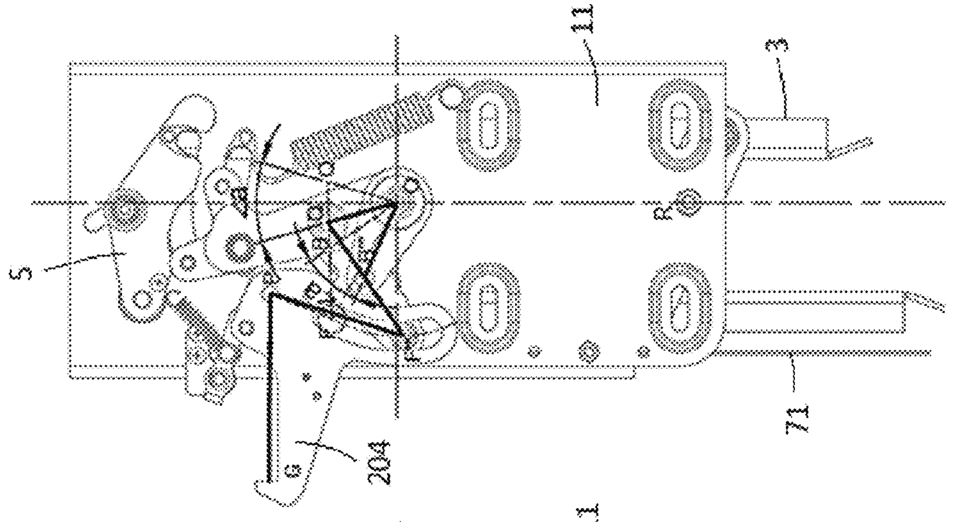
FIGS. 8(*a*)-8(*c*) and 9(*a*)-9(*c*) are the corresponding structural diagrams seen from the first side and the second side of the vane base when the embodiment of the elevator car door locking device shown in FIG. 1 is in three different working states.
Figure 8B:
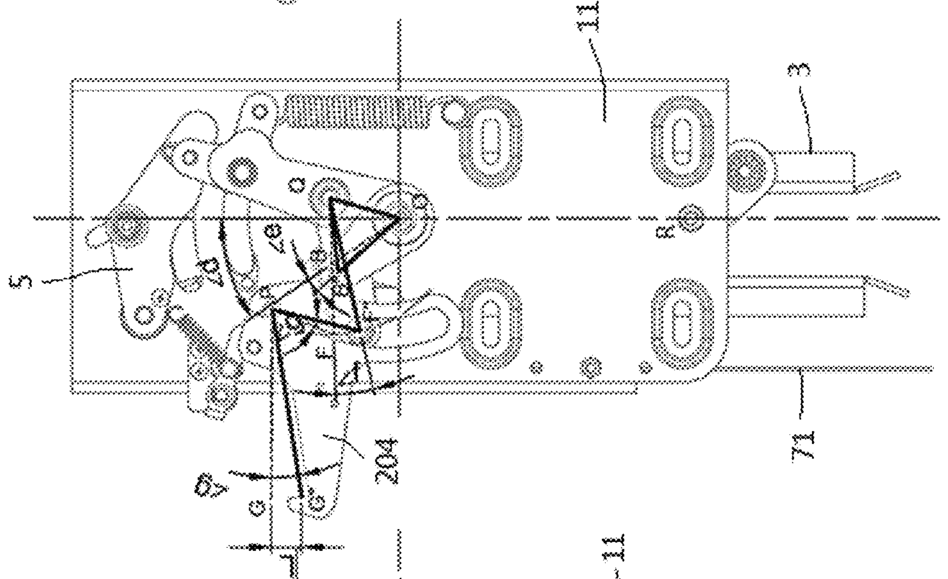
Figure 8A:
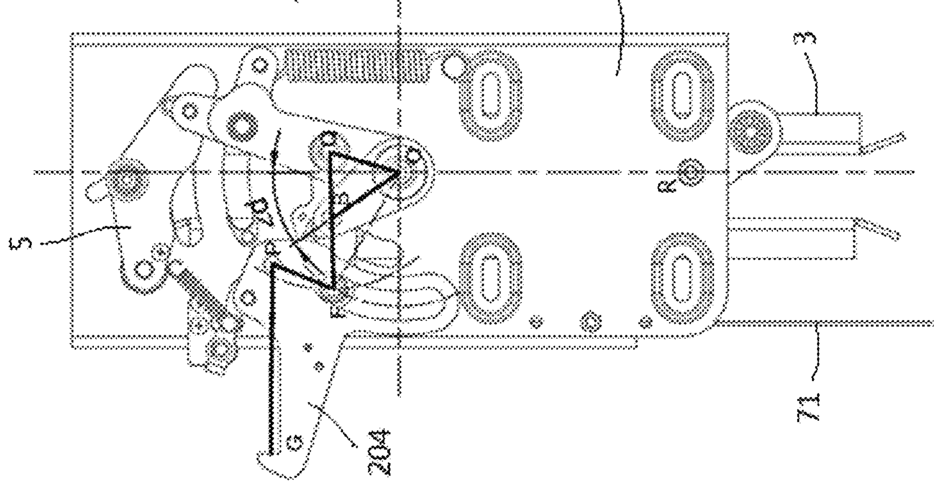
Figures 9A, 9B, 9C:
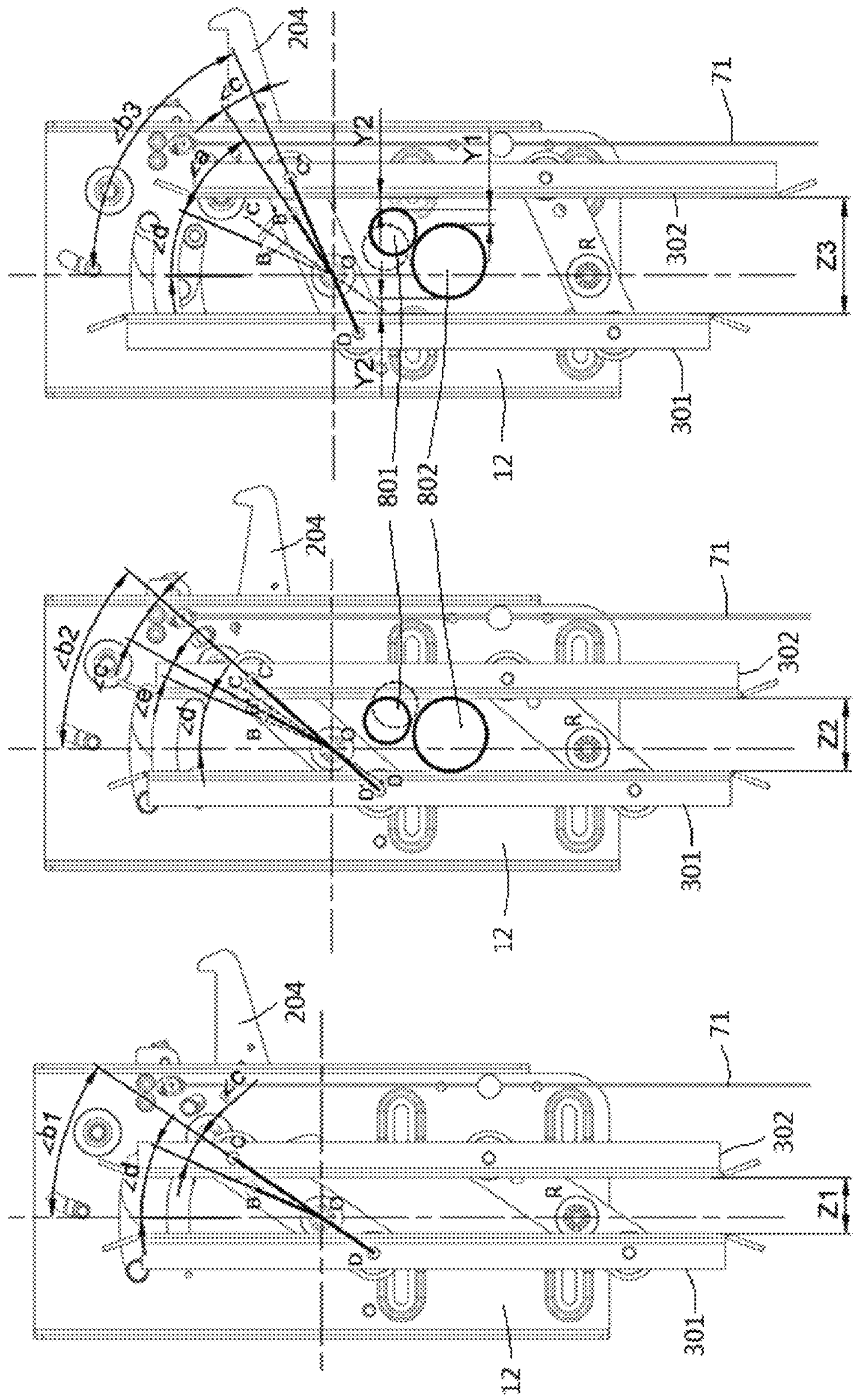
Figure 10A:
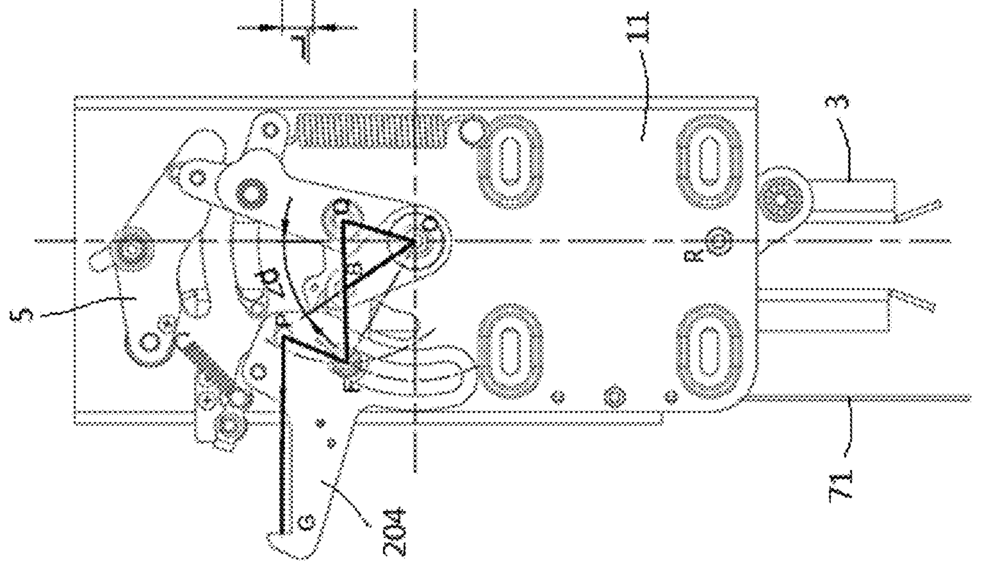
FIGS. 10(*a*)-10(*c*) and 11(*a*)-11(*c*) are the corresponding structural diagrams seen from the first side and the second side of the vane base when the embodiment of the elevator car door locking device shown in FIG. 6 is in three different working states.
Figure 10B:
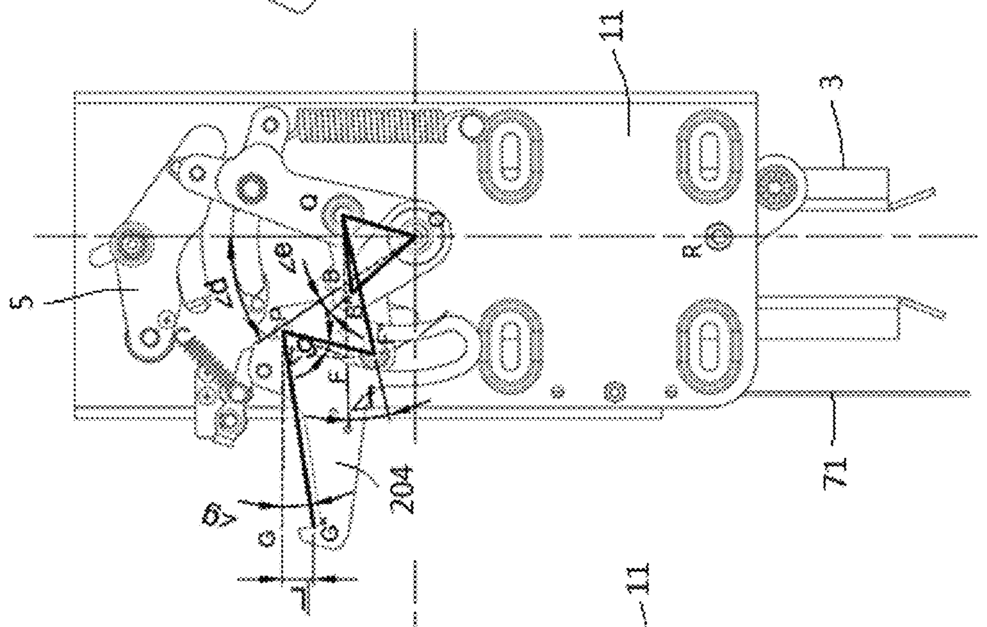
Figure 10C:
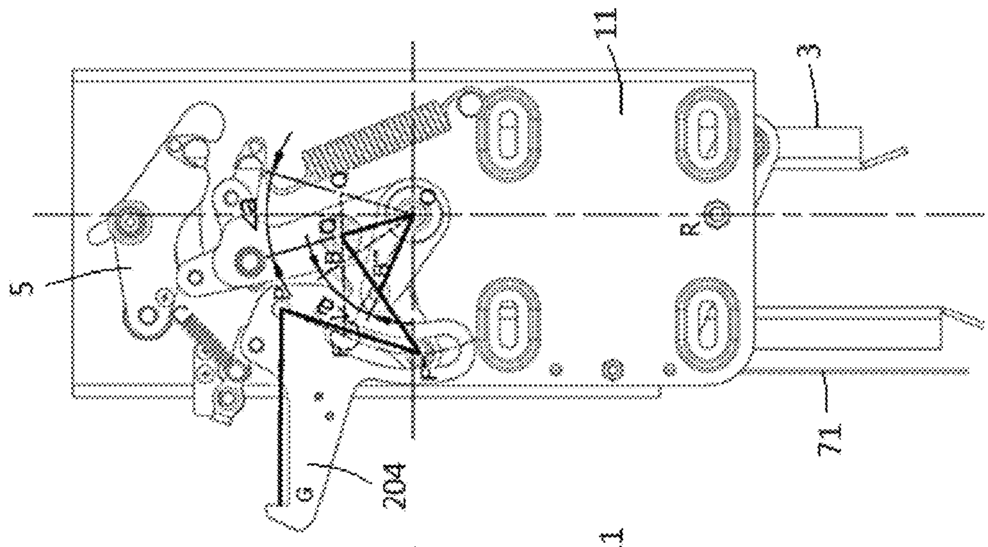
Figure 11C:
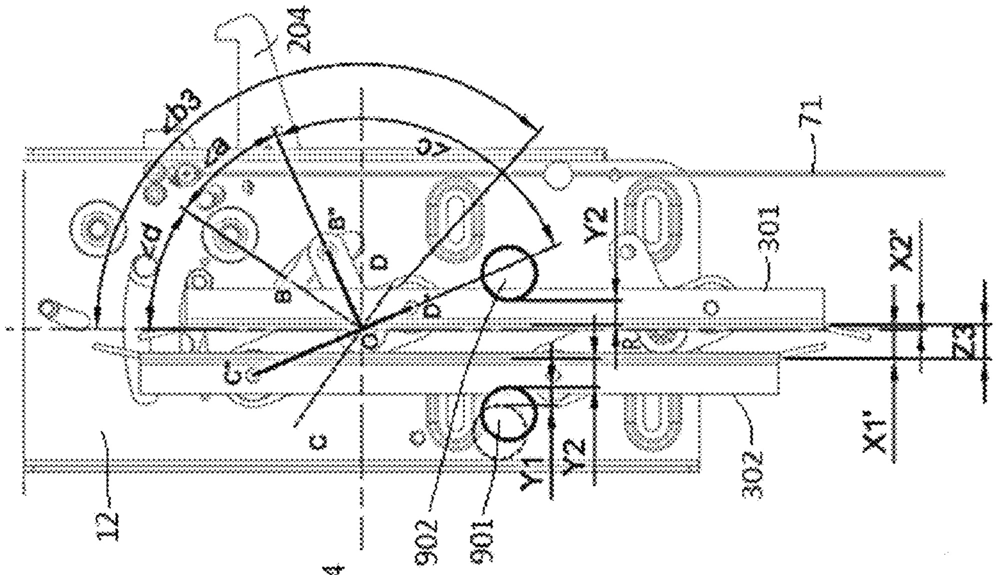
Figure 11B:
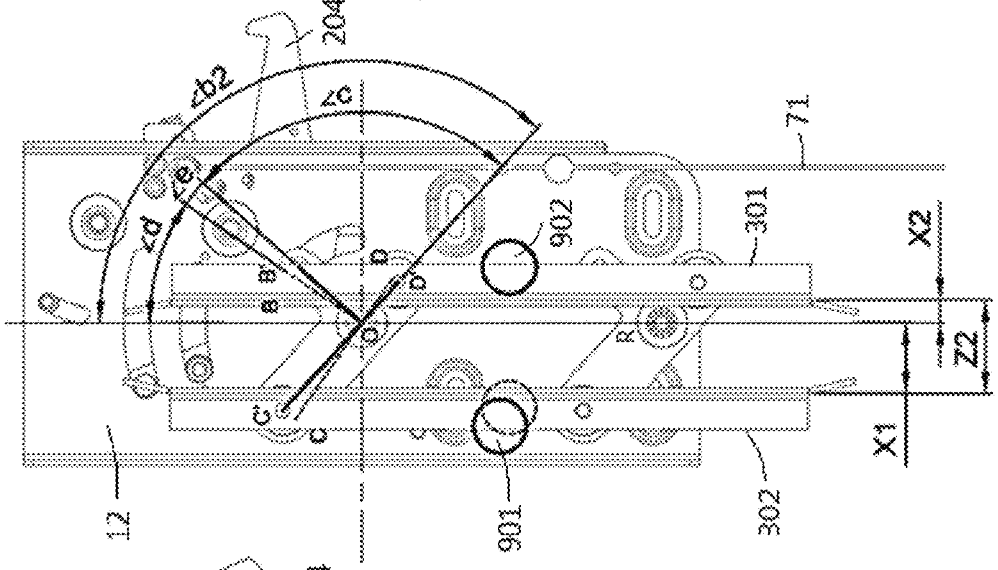
Figure 11A:
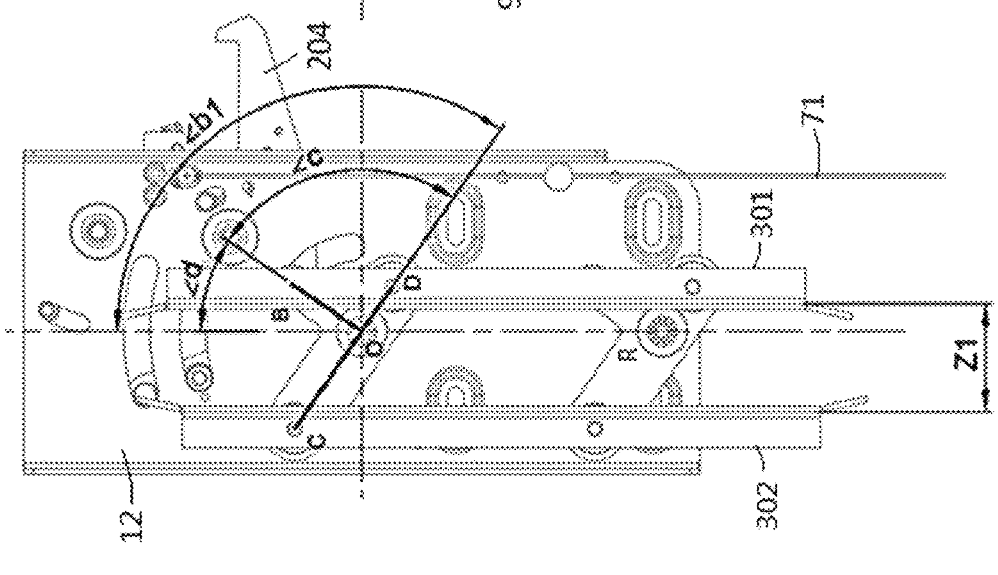

In order to further understand the elevator car door locking device, in conjunction with the two specific embodiments shown in FIGS. 1 to 7, the respective (a), (b) and (c) in FIGS. 8(*a*)-8(*c*) and 9(*a*)-9(*c*) and in FIGS. 10(*a*)-10(*c*) and 11(*a*)-11(*c*) respectively show the corresponding structures and working conditions seen on the first side and the second side when the above two embodiments are in three different working states, in which the vane drive assembly 2 and the vane assembly 3 are elaborated in particular. In FIGS. 9(*a*)-9(*c*), elevator landing door locking balls 801 and 802 matched with the clamping vane are shown, and in FIGS. 11(*a*)-11(*c*), elevator landing door locking balls 901 and 902 matched with the expanding vane are shown.

With reference to the first embodiment corresponding to FIGS. 8(*a*)-8(*c*) and 9(*a*)-9(*c*), and the second embodiment corresponding to FIGS. 10(*a*)-10(*c*) and 11(*a*)-11(*c*), regardless of the clamping vane used in the first embodiment or the expanding vane used in the second embodiment, the following two relational expressions can be determined according to the unlocking stroke of the vane drive assembly 2 and the car door locking hook 204:

$$Z3=Z2+Y1+2*Y2;$$

$$\angle e=k*ar\sin(L/L\_PG)$$

In the figures and the above relational expressions, Z1 is the distance between the first vane and the second vane when the car door locking hook is locked and the vane assembly is in a free state, Z2 is the distance between the first vane and the second vane after the car door locking hook is unlocked, and Z3 is the distance between the first vane and the second vane after the vane assembly releases the landing door locking ball and the car door locking hook is reset and relocked; Y1 is the unlocking distance of the elevator landing door locking ball, and Y2 is the gap between the elevator landing door locking ball and the vane; L is the unlocking height of the car door locking hook, L_PG is the length of the car door locking hook, and k is a coefficient, which can be set based on the structure and transmission effectiveness of the transmission assembly in specific applications, for example, the value range can be optionally set to 0.5-2.0; and ∠a, ∠d, ∠e, ∠f, ∠g and ∠c are respectively the swing angle of the driving member, the included angle between the transmission member and the longitudinal line of the vane base, the unlocking rotation angle of the transmission member, the unlocking rotation angle of the unlocking member, the unlocking rotation angle of the car door locking hook, and the included angle between the transmission member and the first linkage when the car door locking hook turns from the locked state to the unlocked state.

According to the above two relational expressions, the relationship between ∠c and the vane size, and the relationship between the first linkage length L_DC and the length ratio L_OC/L_OD can be further obtained as follows:

$$\angle b1=\angle c+\angle d;$$

$$\angle b2=\angle c+\angle d+\angle e;$$

$$\angle b3=\angle c+\angle d+\angle a;$$

$$L\_DC=Z3/\mathrm{SIN}(\angle b3)=Z3/\mathrm{SIN}(\angle c+\angle d+\angle a)$$

$$L\_DC=Z2/\mathrm{SIN}(\angle b2)=Z2/\mathrm{SIN}(\angle c+\angle d+\angle e)$$

$$Z3/Z2=(Z2+Y1+2*Y2)/Z2=\mathrm{SIN}(\angle c+\angle d+\angle a)/\mathrm{SIN}(\angle c+\angle d+\angle e)$$

$$X1=L\_OC*\mathrm{SIN}(\angle b2);$$

$$X1'=L\_OC*\mathrm{SIN}(\angle b3);$$

$$X2=L\_OD*\mathrm{SIN}(\angle b2);$$

$$X2'=L\_OD*\mathrm{SIN}(\angle b3);$$

$$X1'-X1=Y1+Y2=L\_OC*(\mathrm{SIN}(\angle b3)-\mathrm{SIN}(\angle b2))$$

$$X2'-X2=Y2=L\_OD*(\mathrm{SIN}(\angle b3)-\mathrm{SIN}(\angle b2))$$

$$L\_OC=(Y1+Y2)/(\mathrm{SIN}(\angle b3-\mathrm{SIN}(\angle b2))$$

$$L\_OD=Y2/(\mathrm{SIN}(\angle b3)-\mathrm{SIN}(\angle b2))$$

$$L\_OC/L\_OD=(Y1+Y2)/Y2$$

In the figures and the above relational expressions, ∠b1, ∠b2 and ∠b3 are respectively the included angle between the first linkage and the longitudinal line of the vane base when the car door locking hook is in a free state, the included angle between the first linkage and the longitudinal line after the car door locking hook is unlocked, and the included angle between the first linkage and the longitudinal line after the vane assembly releases the landing door locking ball and the car door locking hook is reset and relocked; X1, X1', X2 and X2' are respectively the distance between the first vane and the first rotation center O when the car door locking hook is in the unlocked state, the distance between the first vane and the first rotation center O when the vane assembly releases the landing door locking ball and the car door locking hook is reset and relocked, the distance between the second vane and the first rotation center O when the car door locking hook is in the unlocked state, and the distance between the second vane and the first rotation center O when the vane assembly releases the landing door locking ball and the car door locking hook is reset and relocked; L_DC is the distance between the first hinge point D (i.e., the hinge point between the first vane and the first linkage) and the second hinge point C (i.e., the hinge point between the second vane and the first linkage) in the length direction of the first linkage; L_OC is the distance between the first rotation center O and the first hinge point D in the length direction of the first linkage; and L_OD is the distance between the first rotation center O and the second hinge point C in the length direction of the first linkage.

According to the above analysis and derivation, it can be learned that in one or some embodiments, by optionally configuring the vane assembly to meet the following two conditions, both clamping vanes and expanding vanes can be compatibly configured at the same time using the same vane drive assembly and vane base, the positive and beneficial effects of which are not yet proposed and achieved in the prior art:

$$L\_CD=Z2/\mathrm{SIN}(\angle c+\angle d+\angle e), \text{ and}$$

$$L\_OC/L\_OD=(Y1+Y2)/Y2.$$

According to the technical solutions of the present disclosure, elevator equipment is further provided. Specifically, the elevator equipment may comprise an elevator car having a car door and a car door locking auxiliary hook mounted on the car door, and an elevator car door locking device designed and provided according to the present disclosure. When the elevator equipment is in use, the car door locking hook in the elevator car door locking device can work in cooperation with the car door locking auxiliary hook in the elevator car to allow the car door to be in a closed state by locking the car door, or allow the car door to be opened. For example, the car door can be locked by the engagement between the car door locking hook and the car door locking auxiliary hook to prevent it from opening, or unlocked by the disengagement between the car door locking hook and the car door locking auxiliary hook to allow opening of the car door. The elevator equipment according to the present disclosure can be widely used as a lifting and transportation device in high-rise, middle-rise or low-rise buildings.

The elevator car door locking device and elevator equipment according to the present disclosure are described above in detail by way of examples only. These examples are merely used to illustrate the principles and embodiments of the present disclosure, rather than limiting the present disclosure. Various modifications and improvements can be made by those skilled in the art without departing from the spirit and scope of the present disclosure. Therefore, all equivalent technical solutions should fall within the scope of the present disclosure and be defined by the claims of the present disclosure.

What is claimed is:

1. An elevator car door locking device, comprising:

a vane base provided with a first rotation center and a second rotation center;

a vane assembly mounted on the vane base and provided with a clamping vane or an expanding vane, and a vane drive assembly mounted on the vane base and having a driving member, a transmission member, an unlocking member and a car door locking hook, wherein the driving member, the transmission member and the vane assembly are hinged to the first rotation center, the car door locking hook is hinged to the second rotation center and has a locked state and an unlocked state, the transmission member is further hinged with the vane assembly through a connecting shaft, and the unlocking member is hinged to a third rotation center on the driving member and is provided with a limiting part for limiting the connecting shaft, wherein the driving member, when driven to move, drives the driving member, the connecting shaft and the unlocking member to rotate around the first rotation center toward a first direction or an opposite second direction, wherein, when the vane assembly is not in contact with a landing door locking ball, the connecting shaft is located at a first limit position on the unlocking member and drives the vane assembly to open or close, and the unlocking member swings along an arc-shaped part on the car door locking hook; when the vane assembly is in contact with the landing door locking ball and is restricted in movement, the connecting shaft rotates to a second limit position on the unlocking member, and the unlocking member swings around the third rotation center to offset the arc-shaped part by a displacement, so that the car door locking hook rotates around the second rotation center toward the first direction until reaching the unlocked state, or rotates toward the second direction until reaching the locked state;

wherein the vane assembly comprises a first vane, a second vane, a first linkage and a second linkage, the first vane and the second vane are hinged with the first linkage and the second linkage respectively to form a four-linkage mechanism, the first linkage is hinged to the first rotation center and is hinged with the transmission member through the connecting shaft, the second linkage is hinged to a fourth rotation center on the vane base, and the fourth rotation center is located directly below the first rotation center along a longitudinal direction of the vane base;

wherein the linkages of the clamping vane or the expanding vane are symmetrically arranged with respect to a connecting line passing through the first rotation center and the fourth rotation center.

2. The elevator car door locking device according to claim 1, wherein the vane assembly is configured such that:

$$L\_DC=Z2/\mathrm{SIN}(\angle c+\angle d+\angle e), \text{ and}$$

$$L\_OD/L\_OC=Y2/(Y1+Y2)$$

wherein L_DC is a distance between a first hinge point and a second hinge point in a length direction of the first linkage, the first hinge point is a hinge point between the first vane and the first linkage, and the second hinge point is a hinge point between the second vane and the first linkage;

L_OD is a distance between the first rotation center and the first hinge point in the length direction of the first linkage;

L_OC is a distance between the first rotation center and the second hinge point in the length direction of the first linkage;

Z2 is a distance between the first vane and the second vane after the car door locking hook is unlocked;

∠c, ∠d, ∠e are respectively an included angle between the transmission member and the first linkage, an included angle between the transmission member and a longitudinal line of the vane base, and an unlocking rotation angle of the transmission member when the car door locking hook is turned from a locked state to an unlocked state;

Y1 is an unlocking distance of an elevator landing door locking ball; and

Y2 is a gap between the elevator landing door locking ball and the first vane.

3. The elevator car door locking device according to claim 2, wherein the unlocking rotation angle Ze of the transmission member is set according to the following formula:

$$\angle e = k * ar \sin(L/L\_PG)$$

wherein L_PG is a length of the car door locking hook, L is an unlocking height of the car door locking hook, and k is a coefficient whose value range is 0.5-2.0.

4. The elevator car door locking device according to claim 1, wherein the car door locking hook is kept in the locked state through a first elastic restoring member mounted on the vane base and connected with the car door locking hook, and a second elastic restoring member is mounted on the vane base and connected with the driving member, the first elastic restoring member comprising a torsion spring and the second elastic restoring member comprising a tension spring.

5. The elevator car door locking device according to claim 1, wherein the vane base has a first side and a second side opposite to each other, and the vane drive assembly and the vane assembly are respectively arranged on the first side and the second side.

6. The elevator car door locking device according to claim 5, wherein the unlocking member and the transmission member are respectively arranged on both sides of the driving member, the unlocking member is closer to the first side than the transmission member, the connecting shaft is connected with the limiting part of the unlocking member in a sliding manner, and the car door locking hook and the driving member are respectively arranged on both sides of the connecting shaft.

7. An elevator equipment, comprising:

an elevator car having a car door and a car door locking auxiliary hook mounted on the car door; and the elevator car door locking device according to claim 1, configured to lock the car door by engaging the car door locking hook with the car door locking auxiliary hook to prohibit the car door from opening, and to unlock the car door by disengaging the car door locking hook from the car door locking auxiliary hook to allow opening of the car door.

8. An elevator car door locking device, comprising:

a vane base provided with a first rotation center and a second rotation center;

a vane assembly mounted on the vane base and provided with a clamping vane or an expanding vane, and a vane drive assembly mounted on the vane base and having a driving member, a transmission member, an unlocking member and a car door locking hook, wherein the driving member, the transmission member and the vane assembly are hinged to the first rotation center, the car door locking hook is hinged to the second rotation center and has a locked state and an unlocked state, the transmission member is further hinged with the vane assembly through a connecting shaft, and the unlocking member is hinged to a third rotation center on the driving member and is provided with a limiting part for limiting the connecting shaft, wherein the driving member, when driven to move, drives the driving member, the connecting shaft and the unlocking member to rotate around the first rotation center toward a first direction or an opposite second direction, wherein, when the vane assembly is not in contact with a landing door locking ball, the connecting shaft is located at a first limit position on the unlocking member and drives the vane assembly to open or close, and the unlocking member swings along an arc-shaped part on the car door locking hook; when the vane assembly is in contact with the landing door locking ball and is restricted in movement, the connecting shaft rotates to a second limit position on the unlocking member, and the unlocking member swings around the third rotation center to offset the arc-shaped part by a displacement, so that the car door locking hook rotates around the second rotation center toward the first direction until reaching the unlocked state, or rotates toward the second direction until reaching the locked state;

wherein the limiting part is a waist-shaped hole, and/or the arc-shaped part is a chute with an arc-shaped contour arranged on the car door locking hook.

9. The elevator car door locking device according to claim 8, wherein the arc-shaped contour of the chute is configured to take the first rotation center as the center of a circle when the car door locking hook is in the locked state.

10. An elevator car door locking device, comprising:

a vane base provided with a first rotation center and a second rotation center;

a vane assembly mounted on the vane base and provided with a clamping vane or an expanding vane, and a vane drive assembly mounted on the vane base and having a driving member, a transmission member, an unlocking member and a car door locking hook, wherein the driving member, the transmission member and the vane assembly are hinged to the first rotation center, the car door locking hook is hinged to the second rotation center and has a locked state and an unlocked state, the transmission member is further hinged with the vane assembly through a connecting shaft, and the unlocking member is hinged to a third rotation center on the driving member and is provided with a limiting part for limiting the connecting shaft, wherein the driving member, when driven to move, drives the driving member, the connecting shaft and the unlocking member to rotate around the first rotation center toward a first direction or an opposite second direction, wherein, when the vane assembly is not in contact with a landing door locking ball, the connecting shaft is located at a first limit position on the unlocking member and drives the vane assembly to open or close, and the unlocking member swings along an arc-shaped part on the car door locking hook; when the vane assembly is in contact with the landing door locking ball and is restricted in movement, the connecting shaft rotates to a second limit position on the unlocking member, and the unlocking member swings around the third rotation center to offset the arc-shaped part by a displacement, so that the car door locking hook rotates around the second rotation center toward the first direction until reaching the unlocked state, or rotates toward the second direction until reaching the locked state;

wherein the vane base is further provided with a limiting mechanism and a guiding mechanism, and the limiting mechanism has a limiting part configured to limit a fitting part on the driving member when the car door locking hook is in the locked state, and a guiding mechanism configured to cooperate with the guiding part when the car door locking hook enters the unlocked state from the locked state, so that the limiting part can release the limit for the fitting part.

11. The elevator car door locking device according to claim 10, wherein the vane base is provided with a first arc-shaped chute and a second arc-shaped chute, the limiting mechanism is connected with the first arc-shaped chute in a sliding manner, and one end of the driving member is connected with the second arc-shaped chute in a sliding manner.

12. The elevator car door locking device according to claim 11, wherein the first arc-shaped chute and the second arc-shaped chute are arranged with the first rotation center as the center of a circle.

13. The elevator car door locking device according to claim 10, wherein the limiting part is configured as a concave part, the fitting part is arranged at an end of the driving member, the guiding part is a roller, and the guiding mechanism is provided with a directing part for directing the roller.

14. The elevator car door locking device according to claim 10, wherein the vane base is provided with a manual unlocking mechanism which is connected with the guiding mechanism through a third elastic restoring member to facilitate the car door locking hook to enter the unlocked state from the locked state by manually operating the manual unlocking mechanism.

* * * * *